United States Patent Office 3,260,763
Patented July 12, 1966

3,260,763
AROMATIC ALKYLATION PROCESS
Stephen M. Kovach, Highland, Ind., and Glenn O. Michaels, Park Forest, Ill., assignors to Sinclair Research, Inc., Wilmington, Del., a corporation of Delaware
No Drawing. Filed Sept. 19, 1961, Ser. No. 139,055
6 Claims. (Cl. 260—671)

This invention relates to an improved process for the alkylation of aromatic compounds. In one specific aspect, the present invention relates to an improved process for the alkylation of aromatic compounds with aliphatic alcohols so as to form polyalkylated aromatics having improved characteristics such as lower coke yields and the like.

Catalytic processes for the alkylation of aromatic compounds are well-known. Generally such catalytic processes make use of the Friedel-Crafts type catalyst, especially aluminum chloride or ferric chloride. Such catalysts are fairly satisfactory for small scale production, but are unsatisfactory for large scale production because of the great expense involved in the loss of large amounts of catalyst. The Friedel-Crafts type of catalysts form strong complexes with aromatic compounds so that separation of the products and recovery of the catalyst is difficult. Consequently even when these catalysts are promoted with halogen acids or in various other ways, they have definite drawbacks for large scale commercial use.

Various attempts have been made to use contact catalysts for the alkylation of aromatic compounds. Such processes have all suffered from the disadvantage of either requiring such long contact times and such large amounts of catalyst as to make continuous operation impossible or have required such high temperatures and pressures for the reaction as to be impractical from the standpoint of equipment design and operating costs.

A particularly undesirable feature of commercial alkylation processes is that these processes have a high rate of formation of coke, thereby necessitating frequent operating shut-downs and catalyst regeneration. The coke deposits on the catalyst cause a decrease in catalyst activity.

The process of the present invention overcomes these above-mentioned deficiencies by the use of a catalyst having an extremely high pore volume. By the use of the catalyst composition of this invention in the alkylation of aromatics there is obtained increased alkylating agent utilization and decreased coke formation. This unexpected result advantageously increases catalyst life and thereby overcomes the need for frequent regeneration of these catalyst materials as is generally necessary under known commercial alkylation processes employed today.

In accordance with the process of the present invention an alkylatable aromatic and an alkylating agent are contacted under alkylating conditions with a catalyst consisting essentially of chromia on a silica-based support, said catalyst having a pore volume in excess of about 0.5 cubic centimeter per gram, preferably in excess of about 0.65 cubic centimeter per gram.

The catalyst base of the present invention is a silica-base or silica-containing catalyst and includes synthetic gel-type catalysts, for instance, those disclosed in U.S. Patents Nos. 2,384,505 and 2,542,190, hereby incorporated by reference, and clay catalysts. These catalysts are acidic, solid, mixed oxide hydrocarbon cracking catalysts. Advantageously, we employ calcined silica-containing catalysts, for instance, containing a major proportion of, or a predominant amount of, for instance at least about 50%, of silica. The silica-base catalyst can include solid metal oxide or mixed solid oxides of metals or non-metals.

Silica-alumina catalysts represent the preferred class of catalyst because of their low cost, regenerability, high rate of conversion obtained and their stability at the operating conditions employed. It is preferred that the silica-alumina catalysts contain at least about 50% silica, up to about 95% silica. The synthetic type of silica-alumina catalyst such as the co-precipitated silica-alumina and alumina precipitated or silica-type are preferred. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$ with substantially the balance being silica. The catalyst may be only partially of synthetic material; e.g. as may be made by precipitation of silica-alumina on an activated clay. One example of such catalysts contains about equal amounts of silicia, alumina gel and clay.

The chromia component of the catalyst of the present invention is added to the silica base in catalytic amounts by known procedures involving impregnation or co-precipitation. Salts of chromium other than the nitrate can be used such as the sulfates and chlorides but the nitrates have the advantage that they decompose to the oxides after calcination without leaving a residue which is difficult to wash out. When employing the impregnation procedure the resulting impregnated product is dried generally at a temperature within the range of about 170° F. to 400° F. for at least about six hours and up to twenty-four hours or more with a stream of air circulated to carry off the water vapor. The dried catalyst mixture then may be formed by a tabletting or extruding operation. If the catalyst is to be in finely divided form, a grinding operation may follow drying. In the case of tabletting it is customary to incorporate a die lubricant which advantageously is organic and can be burned out by oxidation in the calcination step. The product after drying generally contains a substantial amount of water which is driven off at temperatures above about 400° F.

The dried pellets are suitable for subjection to high temperature treatment or calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the silica-alumina-containing product with water vapor at the high temperatures encountered. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The silica-alumina impregnated with the catalytically active components, is finally cooled to yield the finished product. Generally, the amount of chromia in the catalyst of the present invention will be in the range of from about 1 to 15 weight percent, preferably about 1 to 8 weight percent based on the total catalyst.

The advantageous pore volume of the catalyst of the present invention can be obtained by any suitable method as for example by varying the selection of components, treating conditions and other factors which result in increased pore volume. A preferred method of increasing the pore volume is by varying the treatment of the silica base gel. One method involves treating the silica hydrogel by washing or slurrying with an aqueous solution containing a small amount of a surface-active agent, preferably non-ionic, or a water-soluble alcohol and subsequently drying and calcining to give the activated catalyst.

The catalyst employed in the process of the present invention can be easily regenerated employing conventional procedures, for instance by subjecting it to an oxygen-containing gas at temperatures sufficient to burn off carbon deposited on the catalyst during the alkylation. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

In accordance with the present invention, the aromatics, e.g. alkylatable aromatic hydrocarbons, suitable for alkylation include mono- and polycyclic aromatic hydrocarbon compounds such as benzene and its lower alkyl homologues, e.g. toluene and the xylenes, naphthalene and indane, which may be substituted or unsubstituted. The substituted aromatic compounds must, however, contain at least one hydrogen attached to the aromatic nucleus and are preferably methyl-substituted. These compounds may correspond to the general formula

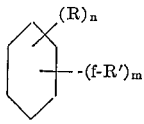

where R is an alkyl, including cyclo alkyl, radical containing generally from about 1 to 20, preferably from about 1 to 8, carbon atoms; $n$ is 0 to 5, preferably 1 to 3; R' is an aromatic hydrocarbon ring, preferably $C_4H_4$; -f- indicates a fused ring relationship (two carbon atoms common to two aromatic nuclei, e.g. as in naphthalene); and $m$ is generally 0 to 1 or more. R may also be a divalent hydrocarbon group attached to the aromatic ring at two carbon atoms of the ring, e.g. alkylene, as in Decalin and Tetralin. The preferred aromatics, however, include alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkyl aromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthracene, rubrene, etc.

The alkylating agents suitable for use in the present process include organic compounds containing an alkyl, including cycloalkyl, radical which is transferable to the aromatic nucleus. These compounds are aliphatic and include alkyl halides, alkanols and others generally containing from about 1 to 20 carbon atoms, preferably from about 1 to 6 carbon atoms, and also contain a radical, e.g. an hydroxyl or ether radical, which will displace a nuclear hydrogen of the aromatic through condensation. The alkylation agent is preferably saturated and frequently contains oxygen which produces water during the alkylation reaction.

A number of suitable alkylating agents correspond to the general formula R—O—R' where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. The alkylating agents usually do not have more than about 18 carbon atoms, preferably up to about 12 carbon atoms. Specific alkylating agents include alkanols such as ethanol, propanol, isopropanol, pentanol, octanol and preferably methanol; and alkyl ethers such as dimethyl ether, diethyl ether and like members whether substituted with non-interfering groups or not. When the alkanols are employed, they may go through an intermediate ether stage. Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

Methanol or dimethyl ether can be employed as the methylating agent. However, methanol holds an edge since dimethyl ether gives slightly lower utilization and higher carbon on the catalyst.

The alkylation reaction conditions used in the method of the present invention generally include a temperature sufficient to maintain the aromatic and alkylating agent feeds in the vapor phase under the pressure employed. This temperature may be from about 400 to 1000° F., preferably from about 500 to 800° F. while the pressure may range from about ambient pressures or less up to about 2000 p.s.i.g., e.g. about 0 to 2000 p.s.i.g., and are preferably elevated pressures ranging from about 50 to 1000 p.s.i.g. The catalyst can be used as a fixed, moving or fluidized bed or in any other convenient type of handling system. The aromatic space velocity will in most cases be from about 0.1 to 10, preferably from about 0.1 to 5, weights of aromatic per weight of catalyst per hour (WHSV). The alkylating agent is generally employed in a molar ratio to the aromatic of about 0.1 to 4:1 and preferably of about 1 to 2:1. Diluent gases, e.g. inert or hydrocarbon, such as $H_2$, $N_2$ and $CH_4$ can also be utilized in the present process usually in the amounts ranging from a diluent gas to alkylating agent molar ratio of about 0.01 to 20:1 or more, preferably about 2 to 10:1.

The following examples will serve to illustrate the present invention and include a method of obtaining the high pore volume catalyst of the present invention but are not to be considered limiting.

EXAMPLE I (1) A $Cr_2O_3$-$SiO_2$-$Al_2O_3$ hydrogel was prepared by dissolving in 3500 cc. of water 3120 grams of

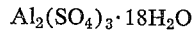

and 68 grams $Cr_2(SO_4)_3 \cdot 15H_2O$. This solution was added to 5732 milliliters of 1:1 silicate of soda which had been added slowly to $H_2SO_4$ while stirring. The two solutions were mixed for 2 minutes and poured into trays to gel over night. 250 cc. of 1:1 ammonium hydroxide was poured over each tray and allowed to stand for 2 hours. Then enough ammonium hydroxide was added to cover the catalyst. The catalyst was then washed with deionized water until free of $SO_4^=$. The wash gel was filtered and separated into 3 portions and oven dried at 115° C. Three catalysts, designated A, B and C, of varying pore volume were prepared by varying the treatment of the hydrogel in the following manner:

One-third of the above gel was treated as follows: the oven-dried material was sieved to 30 mesh, mixed with 4 weight percent Sterotex and tabletted with ⅛" dies, 10# crush strength. The pellets were then calcined 5 hours at 1400° F. The finished catalyst was designated catalyst A and had a pore volume of .22 cc. per gram.

(2) A second portion of the above gel was repeatedly contacted with methanol, stirred, settled and decanted. This was repeated four times until the concentration of methanol in the supernatant liquid was over 90%. The product was then filtered and dried at 115° C. over night. The resulting material was ground to 20-mesh, mixed with Sterotex, tabletted to ⅛" pellets and calcined 5 hours at 1200° F. The finished product was designated Catalyst B and had a pore volume of .46 cc. per gram.

(3) The final third portion of the above gel was treated with 0.3 weight percent solution of Igepal CO (a nonyl phenol ethoxy polymer having 9 ethylene oxide groups per molecule). Enough solution was added to suspend the filter cake. The suspension was stirred repeatedly for 54 hours and then filtered and oven-dried at 115° C. over night. The material was ground to 20-mesh, mixed with Sterotex and tabletted into ⅛" pellets. The catalyst was then calcined 5 hours at 1400° F. The finished catalyst was designated Catalyst C and had a pore volume of .51 cc. per gram.

EXAMPLE II 1530 grams of gelated $SiO_2$-$Al_2O_3$ microspheres were impregnated with 2100 milliliters of a solution containing 49.5 grams of $CrO_3$ and dried at 110° C. The dried material was ground to 20-mesh, blended with 53.4 grams of Sterotex and tabletted to ⅛" by ⅛" pills. The pills were calcined for 6 hours at 900° F. and 5 hours at 1050° F. The finished catalyst was designated Catalyst D, contained 3.38% chromium and had a pore volume of .69 cc. per gram.

EXAMPLE III 2000 grams of Durabead hydrogel (silica-alumina) were placed in a 4-meter beaker. Two liters of deionized water with 4 grams of Igepal CO were then added. 30 grams of chromic anhydride were added while stirring and the mixture was stirred for ½ hour and heated to incipient boiling for 2 hours. Mother liquor was drained off and the resulting material was oven-dried at 110° C. over night. The oven-dried material was heated for 2 hours at 500° F. and for 2½ hours at 1350° F. The finished catalyst was designated Catalyst E, contained 4.29 weight percent chromia and had a pore volume of .40 cc. per gram.

The catalyst compositions prepared in Examples I through III were used in an alkylation process conducted at 600° F., 100 p.s.i.g., .35 WHSV (weight hourly space velocity) and a 1:1 orthoxylene to methanol ratio. A commercial chrome bead cracking catalyst having 3% $Cr_2O_3$ on silica-alumina was also run in the alkylation process. The results are shown in Table I below.

Examination of the data of Table I shows that as the pore volume of the catalyst composition increases there is a totally unexpected reduction of coke formation and at the same time an increase in the methanol utilization.

EXAMPLES IV–IX

Essentially the same alkylation procedure employed with the catalyst of Examples I–III was followed except the alkylating agents and aromatics listed below in their respective example are substituted for the methanol and/or ortho-xylene respectively of the above examples.

| Example | Alkylating Agent | Aromatic |
|---|---|---|
| IV | Dibutylether | Benzene. |
| V | Butanol | Naphthalene. |
| VI | Methanol | Indane. |
| VII | t-Octanol | Toluene. |
| VIII | t-Butyl chloride | O-Xylene. |
| IX | Methyl ether | Do. |

What is claimed is:

1. A process for alkylating an alkylatable aromatic hydrocarbon with an alkylating agent comprising contacting the alkylatable aromatic hydrocarbon with an alkylating agent under alkylation conditions including a temperature of about 400 to 1000° F. in the presence of a catalyst consisting essentially of a catalytic amount of chromia on a silica-alumina support, said catalyst having a pore volume in excess of about 0.5 cc. per gram.

2. The process of claim 1 wherein the alkylatable aromatic hydrocarbon corresponds to the structural formula:

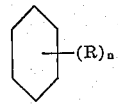

where R is an alkyl radical containing from about 1 to 8 carbon atoms and $n$ is 1 to 3.

3. The process of claim 1 wherein the catalyst contains about 1 to 15% chromia.

4. The process of claim 3 wherein the alkylating agent is an alkanol of 1 to 6 carbon atoms.

5. The process of claim 4 wherein the alkylation conditions include a temperature of about 400 to 1000° F., an aromatic space velocity from about .01 to 10 and an alkylating agent to aromatic molecular ratio of about 0.1 to 4:1.

6. The process of claim 1, wherein the silica-alumina support contains at least about 50% silica.

(References on following page)

Table I

| Cat. Desig. | Catalyst Description | S.A., m.²/gm. | Pore vol., cc./gm. | Ave. Pore Radius A | CH₃OH Utilization, Percent | Coke, Wt. Percent on Feed |
|---|---|---|---|---|---|---|
| D | SiO₂-Al₂O₃ MS imp. with Cr₂O₃. | 332 | 0.69 | 41.6 | 69–73 | 2.2 |
| C | Surfactant treated Cr₂O₃-SiO₂-Al₂O₃. | 278 | 0.51 | 36.7 | 61 | 3.2 |
| B | Alcogel type Cr₂O₃-SiO₂-Al₂O₃. | 312 | 0.46 | 29.5 | 60 | 4.2 |
| E | Durabead imp. with Cr₂O₃. | | 0.40 | | 54 | 4.25 |
| A | Xerogel type Cr₂O₃-SiO₂-Al₂O₃. | 164 | 0.22 | 26.8 | 46 | 7.5 |
| | Chrome Bead Reference Cat. | 285 | 0.46 | 32.3 | 58 | 3.4 |

References Cited by the Examiner

UNITED STATES PATENTS

| | | | |
|---|---|---|---|
| 2,383,179 | 8/1945 | Egloff | 260—671 |
| 2,384,505 | 9/1945 | Thomas et al. | 260—671 |
| 2,500,197 | 3/1950 | Michael et al. | 260—671 |
| 2,691,647 | 10/1954 | Field et al. | 260—671 |
| 2,913,398 | 11/1959 | Riblett et al. | 208—136 |

DANIEL E. WYMAN, *Primary Examiner.*

ALPHONSO D. SULLIVAN, *Examiner.*

J. E. DEMPSEY, *Assistant Examiner.*